United States Patent

[11] 3,595,347

| [72] | Inventor | Henry R. Billeter<br>Deerfield, Ill. |
|---|---|---|
| [21] | Appl. No. | 832,544 |
| [22] | Filed | May 12, 1969 |
| [45] | Patented | July 27, 1971 |
| [73] | Assignee | Sloan Valve Company<br>Chicago, Ill. |

[54] DOUBLE-ACTING SLACK ADJUSTERS
15 Claims, 9 Drawing Figs.

[52] U.S. Cl. .................................................. 188/202,
 188/196 PRR
[51] Int. Cl. ........................................................ F16d 65/66
[50] Field of Search .......................................... 188/196,
 198—203

[56] References Cited
UNITED STATES PATENTS

| 3,113,645 | 12/1963 | Feuilly............................ | 188/196 |
| 3,177,985 | 4/1965 | Rauglas.......................... | 188/196 |
| 3,326,335 | 6/1967 | Billeter........................... | 188/196 X |
| 3,096,859 | 7/1963 | Showers et al................. | 188/196 |

*Primary Examiner*—Duane A. Reger
*Attorney*—Parker, Carter & Markey

ABSTRACT: This slack adjuster employs a threaded rod telescoped within a tubular housing in which there are three spin nuts on the rod adapted to be rotated to either take up slack or let it out. The spin nuts have clutch surfaces engageable with cooperating clutch surfaces in the housing to control the action of the spin nuts. A pin and ratchet on one of the spin nuts prevents it spinning in one direction and a torsion spring prevents spinning of another nut in another direction.

PATENTED JUL 27 1971 3,595,347
SHEET 1 OF 3
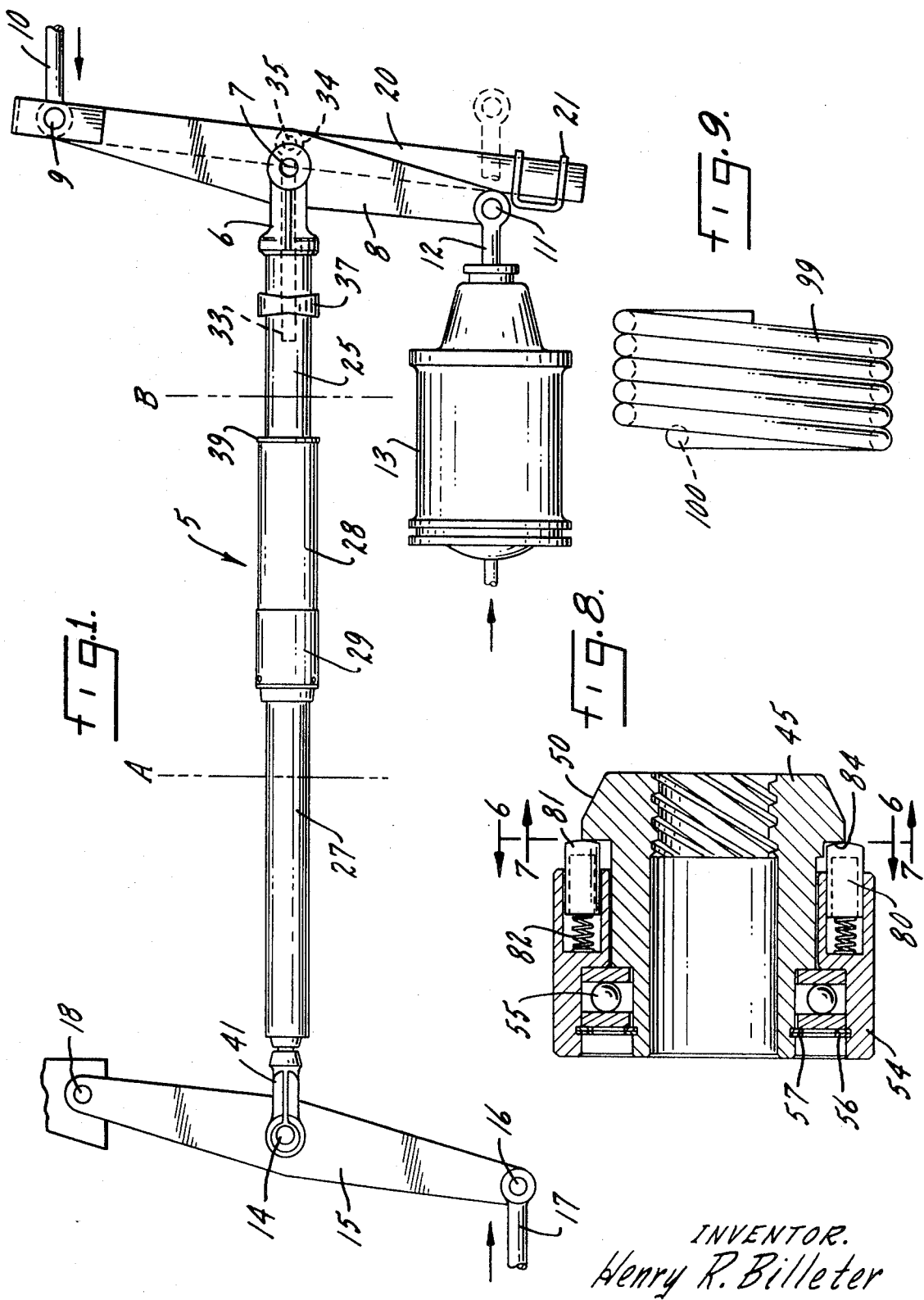
INVENTOR.
Henry R. Billeter
BY Parker, Carter & Markey
Attorneys.

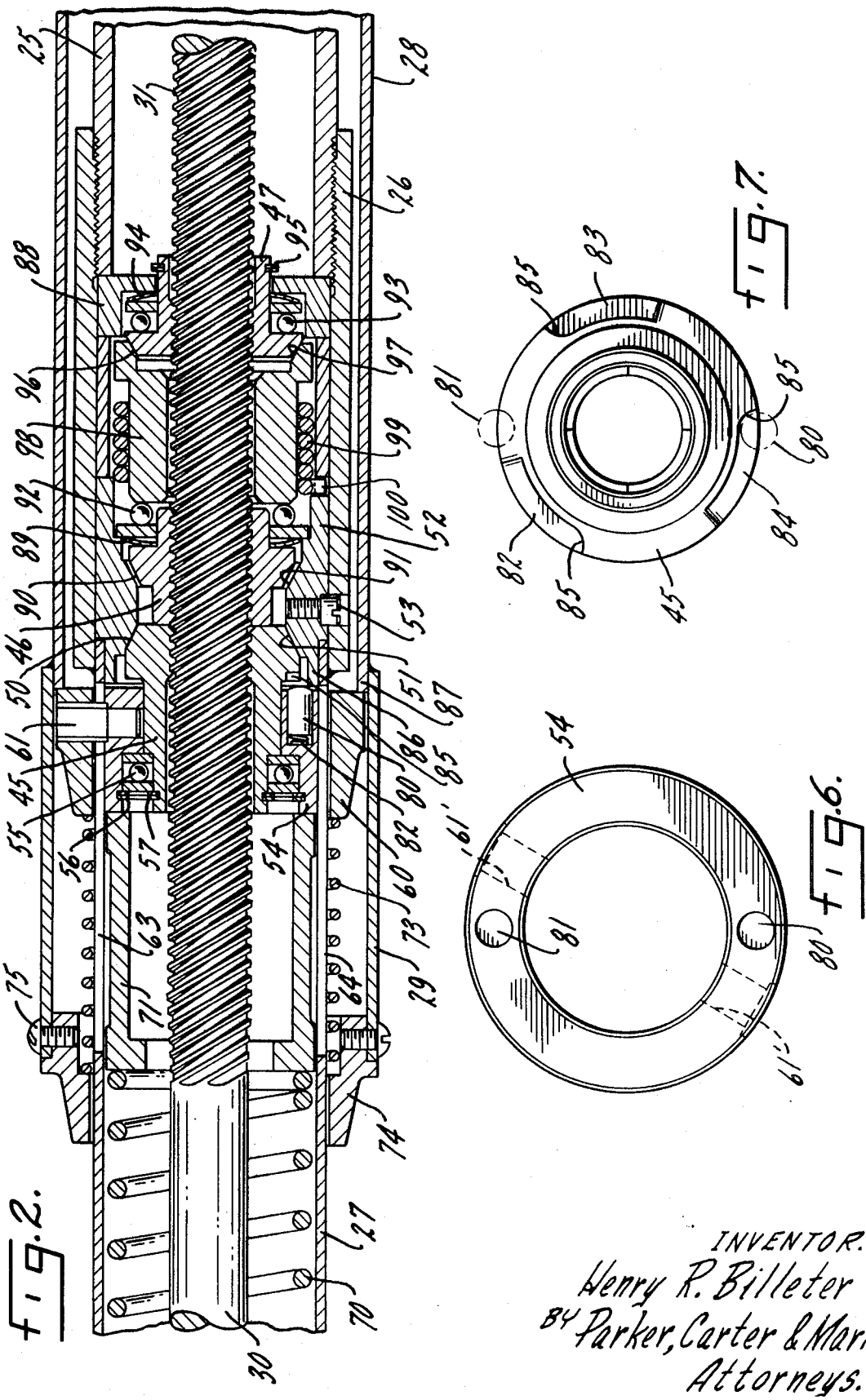

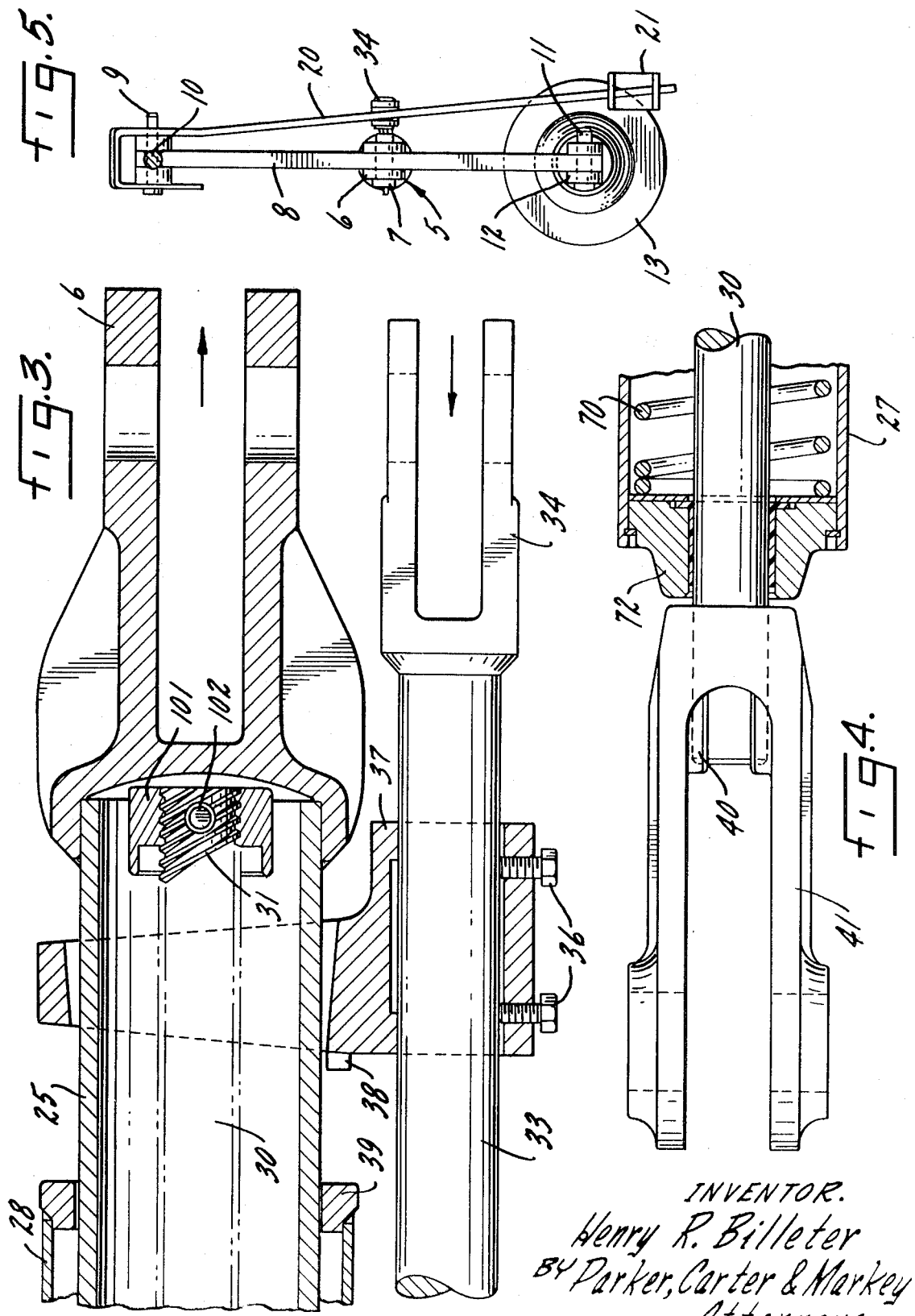

3,595,347

DOUBLE-ACTING SLACK ADJUSTERS

CROSS REFERENCE TO RELATED PATENT

This invention is in the nature of an improvement upon applicant's U.S. Pat. No. 3,249,183, issued May 3, 1966.

FIELD OF THE INVENTION

This invention relates in general to slack adjusters and more particularly to automatic double-acting slack adjusters for railway cars for automatically reducing or increasing the slack in the brake rigging in order to maintain optimum brake shoe clearance at all times. The device uses fewer parts, is lighter in weight, and more compactly constructed to fit into all types of installations on railway cars. It is relatively simple and rugged in construction and all the operating parts are protected from dirt and weather.

One of the principal objects of the invention is to produce a slack adjuster which can be made up of parts which are economical to manufacture including standard size tubing and housing and simple castings. The spin nuts and clutching surfaces are simple in construction and no expensive large size springs are employed.

It is a further object to simplify the trigger mechanism which senses the excess of slack, by incorporating the same within the housing of the slack adjuster and utilizing tubular casings enclosing and protecting the mechanism as part of the actuating mechanism.

BRIEF DESCRIPTION OF THE DRAWINGS

FIG. 1 is a plan view illustrating a typical brake rigging arrangement for a railway car with the slack adjuster of the invention shown therein;

FIG. 2 is an enlarged cross-sectional view of the center portion of the slack adjuster taken between the points A and B of FIG. 1;

FIG. 3 is a sectional view of a portion of the right-hand end B of the slack adjuster;

FIG. 4 is a sectional view of a portion of the left hand end A of the device;

FIG. 5 is an end view of the right side of FIG. 1;

FIG. 6 and 7 are plan views of the pin and ratchet mechanism taken along the lines 6—6 and 7—7 of FIG. 8;

FIG. 8 is a cross section of the assembly of the takeup spin nut and pin and ratchet mechanism; while FIG. 9 is a side view of the torsion spring employed.

The improved double-acting slack adjuster of the invention is adapted for installation in the brake rigging of a railway car in the usual position between the brake cylinder and brake shoes and specifically as a center rod connection in the brake rigging between the live lever and the dead lever as shown in FIG. 1. When so installed it will automatically take up excess slack as wear occurs in the brake shoes and rigging, and let out slack as new brake shoes are installed, in order to maintain the travel of the brake cylinder push rod within the limits prescribed by railroad practice regulations. The slack adjuster is adapted to take up slack to at least 19 inches if necessary.

DETAILED DESCRIPTION OF SLACK ADJUSTER

The slack adjuster, indicated generally at 5, comprises a unitary structure including a dirt and dustproof casing or housing connected at the right-hand end by the clevis 6 and pivot pin 7 to the center portion of live lever 8. The upper end of live lever 8 has a pivot pin 9 for connection with a portion of the brake rigging 10 leading to the brake shoes (not shown). The bottom end of live lever 8 is pivoted by pin 11 to the end of pushrod 12 of the brake cylinder 13, which has a movable piston therein responsive to the usual brake control device of the railway car upon a brake application.

The left-hand end of the slack adjuster 5 with the attaching clevis 41 is pivoted by pin 14 to the midportion of dead lever 15. This dead lever 15 in turn is pivoted at 16 at its lower end to a portion 17 of the brake linkage also leading to the brake shoes. At its upper end the dead lever 15 is pivoted at 18 to a fixed part of the railway car frame. Additionally, adjacent to live lever 8 (FIG. 5) there is an actuating lever 20 also pivoted at its upper end by pin 9 and having its lower end loosely slidable and pivoted in a slot formed in bracket 21 supported on the railway car frame. The general arrangement of the foregoing elements is well known and is such that outward projection of the pushrod 12 by action of the brake cylinder 13 results in the movement of levers 8 and 15 together with the slack adjuster 5, so that braking pull is applied to the linkages 10 and 17 in the direction as shown, to produce an application of the brakes.

The slack adjuster 5 is preferably made up of a series of elongated hollow tubes or housing 25, 26 and 17, all suitably joined together as by welding or threading into a single unitary structure for the entire length of the device so that the internal operating elements are properly protected and enclosed from the weather, flying stones, and other possible damage. A trigger tube of two parts 28 and 29 welded together surrounds the other three tubes and is in close slidable engagement therewith. A threaded power rod 30 is disposed for axial longitudinal shifting movement within the housing tubes 25, 26 and 27, and for a substantial portion of its length within the tubular casings is provided with nonself-locking threads 31 having a high helix angle upon which a series of spin nuts are adapted to be rotated, as will be pointed out.

The trigger arrangement for sensing excess slack is controlled by the actuating lever 20 and includes a trigger rod 33 arranged alongside the slack adjuster at one end of which there is a clevis 34 secured by a pivot pin 35 to the approximate midpoint of the actuating lever 20. The trigger rod 33 is clamped by locking screws 36 to a slidable bracket 37 loosely surrounding the housing tube 25. An abutment 38 on bracket 37 under certain conditions is adapted to engage a collar 39 secured to the end of housing tube 28. The collar 39 surrounds and is in sliding engagement with housing tube 25. The collar 39 is adapted, when contacted by the abutment 38, to shift the trigger tube 28 to the left after the pushrod 12 has been extended a distance of between 7 and 9 inches indicating excess slack, as will be pointed out. The locking screws 36 enable the rod 33 to be adjusted the proper amount in accordance with the particular installation, and the relative looseness of bracket 37 around housing tube 25 prevents binding due to slight inequities that may be present in the installation. A further rough adjustment to properly arrange the slack adjuster 5 between the live lever 8 and dead lever 15, is provided by the screw-threaded connection 40 of the clevis 41 with the left-hand end of rod 30.

In screw-threaded engagement with the threads 31 on threaded rod 30, there is a plurality of spin nuts including takeup spin nut 45, lockup spin nut 46, and let-out spin nut 47. These spin nuts under certain conditions are free to rotate upon the rod 30 to either take up slack or let it out. The takeup spin nut has a clutching surface 50 arranged in cooperative relationship with a clutching surface 51 formed in the clutch sleeve or housing 52. This housing 52 is secured to the tubular housing 26 by screws 53. The shank portion of takeup spin nut 45 is surrounded by and rotatable within an inner collar 54. A thrust bearing 55 is arranged between the shank portion of spin nut 45 and the collar 54 and is held in place by two separate snap rings 56 and 57. A second outer collar 60 surrounds the inner collar 54 and both are fastened together for slidable movement inside and outside of the housing tube 27. A pair of locking pins, 61, pass through apertures 61', to fasten the two collars together. These locking pins extend through slots 63 and 64 formed lengthwise in the tubular housing 27 and have flat sides and a round head to lock them in place in the slots.

In the normal brakes released position as shown in FIG. 2 a trigger restoring spring 70 around rod 30 exerts its pressure at one end against a sleeve spacer 71 slidable inside the tubular housing 27 and at the opposite end bears against a bushing 72 suitably secured to the end of tubular housing 27. The rod 30 extends slidably through and in sealing engagement with the bushing 72. The other end of sleeve spacer 71 bears against the rear side of inner collar 54 and this in turn against spin nut 45, holding the spin nut in engagement with clutch surface 51.

A secondary trigger spring 73 extends between outer collar 60 and bushing 74, which bushing is slidable along tubular housing 27, and is secured to the end of trigger housing tube 29 by screws 75. The several bushings 39, 72 and 74, serve to seal off the interior operating mechanism from dirt and damage as well as guide the telescoping action of the tubular housings.

A pin and ratchet operating mechanism is arranged between the rear side of the takeup spin nut 45 and the inner collar 54 within which the spin nut is adapted to revolve, for permitting the spin nut to revolve in only one direction. The two pins 80 and 81 located opposite each other in recesses in the inner collar 54 (See FIGS. 6 and 8), are urged outward by springs 82 toward operational engagement with grooves 82, 83, 84 (See FIG. 7). These grooves are gradually tapered inward to the deeper abutment or stops 85, and are arranged so that the pins 80 and 81 can ride in the grooves and snap over the abutments 85 when the spin nut 45 rotates clockwise, but when the spin nut attempts to rotate in the opposite direction the pins engage the stops 85 and prevent this movement. It will be noted that whereas there are only two pins 80 and 81, there are three grooves 82, 83 and 84, so that only one pin at a time can engage an abutment 85. In the normal position shown in FIG. 2, the pins 80 and 81 are held inward away from the grooves by their engagement with the edge portion 86 of the clutch sleeve 52. In addition, the annular edge portion 87 on the left-hand end of trigger tube 28 abuts the outer edge of the outer collar 60 as shown.

The lockup spin nut 46 has a tapered clutch surface 90 arranged in operative relation to a clutch surface 91 formed in the clutch sleeve 52. These clutch surfaces are normally held disengaged by the forward end of spin nut 46 being in contact with the end of takeup spin nut 45. A bearing 92 and its thrust washer, together with a bowed spring washer 89, are provided on the rear side of the spin nut 46.

The let-out spin nut 47 is rotatable with a sleeve 98 and has a bearing 93 together with a bowed washer 94 pushing against the bearing 93. The collar 88 supports the parts in position and a snap ring 95 limits the movement of spin nut 47 with respect to the collar 88. The forward flanged end of let-out spin nut 47 is provided with a tapered clutch surface 96, which normally is in frictional engagement with a cooperating clutch surface 97, formed on one end of sleeve 98. The other end of sleeve 98 normally contacts the bearing 92 of spin nut 46, so the sleeve can rotate freely around the threaded rod 30 under certain conditions. A tightly coiled torsion spring 99 (See FIG. 9), is wrapped or coiled around the sleeve 98, so that normally, as shown, it rather tightly embraces the sleeve, to prevent its rotation in one direction but relaxes and uncoils when the sleeve is rotated in another direction to permit free rotation of the sleeve. One end of the torsion spring 99 is free, while the other end 100 is anchored in a notch formed in the clutch sleeve 52.

At the right-hand end of the threaded rod 30, a stop bushing 101 is threaded upon the rod to prevent the rod from being drawn completely out of the spin nuts. The bushing 101 is additionally secured by a pin 102 driven through the rod and bushing.

DESCRIPTION OF THE OPERATION

FOr reasons well understood in the art, the maximum stroke of the brake cylinder pushrod 12 in response to a braking operation cannot exceed 12 inches, and an optimum range of 8 inches is selected for the slack adjuster to make its automatic adjustment for abnormal slack which may be present in the brake rigging linkage or brake shoes. The various parts of the brake rigging and slack adjuster are shown in the drawings as they appear in the position with the brakes released and the railway car in the running position. When a brake application is made the pushrod 12 is forced outward by air pressure in the brake cylinder 13, thereby activating the live lever 8, and since the upper end of the trigger lever 20 is also pivoted at 9, and the lower end of trigger lever 20 is slidably restrained by the bracket 21, the levers 8 and 20 will separate angularly about pin 9. As the slack adjuster 5 is pivoted to the center of live lever 8 at pivot 7, the angular separation movement of both levers will cause the midpoint of trigger lever 20 to shift the clevis 34 and its rod 33 inward or to the left. This movement is so calculated that the lower end of live lever 8 will be operated by the pushrod 12 over a movement of between 7 and 8 inches before the trigger bracket 37 engages the collar 39 on the trigger tube 28. Any travel of the pushrod beyond this distance indicates an excess of slack in the brake system which must be corrected.

Assume that there is insufficient slack in the brake system as would be the result of the installation of new brake shoes for example. It would accordingly be necessary to introduce some slack in the system by increasing the overall length of the slack adjuster. Under these conditions, upon a brake application the slack adjuster 5 will initially move as a solid unit or link in the system. This occurs because the bowed spring washer 94 forces the let-out spin nut 47 tightly into engagement with clutch surface 97 and the tension spring 99 prevents rotation of the sleeve 98, preventing rotation of let-out spin nut 47 on rod 30. Since there is insufficient slack in the system the brake shoes will engage the car wheels almost immediately, or before the brake cylinder piston has traveled the required distance (8 inches), thereby creating a certain amount of stress in the braking and linkage system which increases until the tension of the bowed spring washer 94 is released. The power rod 30 at this time is being pulled to the left-hand side while the tubular housing 25 pulls to the right. The let-out spin nut 47 is now caused to revolve on the rod 30 and its bearings 93, and at the same time the sleeve 98 is caused to be revolved in the direction to unwind the torsion spring 99. The pull on rod 30 likewise causes the takeup spin nut 45 to be unseated from clutch surface 51. Lockup spin nut 46 can also now rotate toward clutch surface 91. All three spin nuts are now free to revolve on the threaded rod 30 so the rod pulls to the left and lets out the slack, or increases the length of the slack adjuster. When the required amount of slack has been let out, and the brake cylinder pushrod 12 is extended to about 8 inches, the trigger lever 20 will have shifted the trigger rod 33 an amount so that the bracket 37 engages its abutment 38 with the collar 39 on trigger housing 28, resulting in a left-hand shifting of trigger housing 28. The left-hand abutment end 87 of tubular housing 28 as a result now pushes the outer collar 60 together with the inner collar 54 and the takeup spin nut 45, to the left, thereby disengaging clutch surfaces 50 and 51 and allowing lockup spin nut 46 to firmly engage clutch surface 91. This action rigidly couples the threaded pull rod 30 with the slack adjuster casing, as a solid link in the linkage. During this short movement takeup spin nut 45 may slightly revolve and the ratchet pins 80 may slip around the ratchet grooves 82—84 without effect at this time.

Upon release of the brakes, the gravity weight of the brake rigging together with the brake beams and brake shoes, restores the slack adjustment parts to the normal running position shown, but with all the spin nuts in a new position on the threaded rod 30. This restoring movement is also assisted by the tension stored in the trigger spring 70 and spring 73. In addition during release the ratchet pins 80 now engage the stops 85 in takeup spin nut 45 preventing its rotation, but permitting lockup spin nut 46 to slip on clutch surface 91. The let-out spin nut 47 at this time is likewise caused to slip on clutch surface 97. It will be noted that in the case of insufficient slack the trigger bracket 37 does not contact the trigger housing 28 until after the slack has been let out upon application of the brakes.

In the event there is an excess of slack in the system as would be caused by wear of the brake shoes, loss of one or more shoes, or other causes, the brake cylinder pushrod 12 would be operated beyond the maximum permitted 8-inch stroke during which the slack adjuster would move as a solid link in the system, as has been pointed out heretofore. When the excess slack condition prevails, the operation of the actuating trigger lever 20 results in the trigger housing 28 being shifted to the left and its abutment 87 to push against the outer collar 60. As a result takeup spin nut 45 is free of clutch surface 51 and rotates to the left on rod 30. The ratchet pins 80 engage and rotate over the grooves 82—84 under pressure of the small pin springs 82. The takeup spin nut 45 continues to rotate until the amount of excess slack has been taken up and when tension takes place in the braking system. Lockup spin nut 46 thereupon engages clutch surface 91, locking the threaded rod 30 and the tubular casings together as a solid unit. The let-out spin nut 47 also engages clutch surface 97 in frictional contact, thus further locking up the slack adjuster. The spin nuts 45 and 46 are accordingly separated from each other on the threaded rod 30 in accordance with the amount of excess slack. As the takeup spin nut 45 rotates it ratchets around the pins 80 and grooves 82.

Upon the release of the brakes the weight of the braking system restores the slack adjuster equipment, assisted by the restoring action of springs 70 and 73 of the trigger mechanism. The takeup spin nut 45, however, during this return movement, is prevented from rotating because the ratchet pins 80 are now in engagement with the stops 85 on grooves 82—84, and since the braking tension is removed from the spin nuts 46 and 47 due to the right hand inward movement of the threaded rod 30, these spin nuts slip on their clutch surfaces and spin on the threaded rod until spin nuts 45 and 46 are joined together again. The direction of rotation of the let-out spin nut 47 is such that the torsion spring 99 is unwound or relaxed so the nut is free to spin. The ratchet pins 80 then engage the abutment 86 of the housing 52 to disengage and release them from the grooves 82—84.

From the foregoing it will be clear that when there is insufficient slack in the braking system and it must be let out, the trigger mechanism is not effective to control the device, and the slack is let out during the brake application. On the other hand, with an excess of slack the trigger mechanism is operative to take up the slack at the time the brakes are being released so that upon a subsequent brake application they will be in normal condition.

Referring to FIGS. 2 and 8, when the trigger tube abutment edge 87 engages the outer collar 60, the inner collar 54, being tied to it by lock pins 61 in aperture 61', exerts its pressure to the left against the bearing 55 which, in turn, exerts a thrust against the inner snap ring 56, whereas when the takeup spin nut 45 is pulled to the left by the rod 30, the thrust by the bearing 55 is against the snap ring 57. This action and arrangement stabilizes the rotation of the spin nut 45 and collars 54 and 60 as they rotate, so that no wobble or vibration can take place in the parts.

Due to the absence of a powerful heavy restoring spring acting against the braking pressures, the slack adjuster parts can be made much simpler or lighter; therefore the device operates more reliably, with the spin nuts enabled to rotate more freely and with less friction. The equipment is relatively immune to shocks and transient vibrations so that false slack let out or takeup cannot possibly occur. Should the pull rod 30 be given an inward thrust or shock, the takeup spin nut 45 would be pressed much firmer against the clutch surface 51, in addition to the force provided by the springs 70 and 73. Should the pull rod 30 be given a transient outward pull, a false let out is prevented by the spin nut 47 and bowed washer 94, holding it tightly in engagement with clutch surfaces 96 and 97. The gripping force of torsion spring 99 upon sleeve 98 also provides for this contingency.

I claim:

1. In an automatic double-acting slack adjuster adapted to adjust for variations of slack in the brake rigging of railway cars, the combination of a threaded rod and a tubular casing connected in said brake rigging and movable axially with respect to one another, said threaded rod having nonself-locking threads thereon and a pair of spin nuts on said rod adapted to be rotated along said rod, cooperating clutch surfaces on said spin nuts and said tubular casing the mutual engagement of which stops the rotation of said spin nuts, spring means for urging said spin nuts into clutching engagement with said tubular casing clutch surfaces, a collar surrounding the first of said spin nuts and within which said first spin nut is adapted to revolve, spring-pressed pins in said collar, ratchet means formed on said first spin nut, said spring-pressed pins adapted to engage said ratchet means to prevent rotation of said spin nut in one direction, means responsive to a brake application for causing said first spin nut to disengage from its clutch surface and said second spin nut to engage its clutch surface, and trigger control means adapted to disengage said spring-pressed pins from said ratchet means to permit said first spin nut to revolve on said threaded rod to take up excess slack.

2. In an automatic double-acting slack adjuster adapted to adjust for variation of slack in the brake rigging of railway cars, a threaded rod and a tubular casing surrounding said threaded rod each connected to a separate part in said brake rigging and movable axially with respect to one another, said threaded rod having nonself-locking threads thereon, a takeup spin nut and a lockup spin nut on said threaded rod adapted to be rotated along said rod, cooperating clutch surfaces between each of said spin nuts and said tubular casing, the engagement of which stops the rotation of said spin nuts, spring means for urging said spin nuts into clutching engagement with said tubular casing clutch surfaces, a collar surrounding said takeup spin nut, thrust bearings between said takeup spin nut and said collar, whereby said takeup spin nut is adapted to be rotated on said rod within said collar, spring-pressed ratchet pins in said collar, ratchet means on said takeup spin nut adapted to be engaged by said ratchet pins to permit rotation of said takeup spin nut in one direction to take up slack and prevent rotation in the other direction, and trigger operated means for engaging said collar to disengage said pins from said ratchet means when excess slack occurs.

3. In a double-acting slack adjuster adapted to adjust for variation in the slack of the brake rigging of railway cars, an axial threaded rod and a tubular casing around said threaded rod, said threaded rod being connected to one portion of said brake rigging and said tubular casing to another portion, said threaded rod having nonself-locking threads thereon, a plurality of spin nuts rotatable on said threaded rod including a takeup spin nut, a lockup spin nut, and a let-out spin nut, said takeup and said lockup spin nuts having clutch surfaces thereon adapted to engage cooperating clutch surfaces on said tubular casing, a collar around said takeup spin nut within which said takeup spin is adapted to revolve, said collar having a plurality of spring-pressed pins therein projecting towards said takeup spin nut, a plurality of ratchet means on said takeup spin nut adapted to be engaged by said pins to prevent rotation of said takeup spin nut in one direction, a shoulder formed on said tubular casing normally holding said pins disengaged from said ratchet means, and trigger operated means adapted to engage said collar in taking up slack to disengage said pins from said ratchet means and whereby said takeup spin nut is disengaged from its clutching engagement with said clutch surfaces.

4. In an automatic double-acting slack adjuster for the brake rigging of a railway car, a tubular housing and a threaded rod reciprocal within said housing, a plurality of spin nuts including a takeup spin nut within said housing threaded on said rod, means for causing said spin nuts to revolve on said rod to take up or let out slack in said brake rigging, said takeup spin nut having a clutch surface urged toward engagement with a cooperative clutch surface on said tubular housing, a cylindrical-shaped collar shiftable within said tubular housing and surrounding said takeup spin nut, said takeup spin nut adapted to revolve within said collar and having ratchet means thereon, said collar having spring-pressed pins adapted to engage said ratchet means to permit rotation of said takeup spin nut in only one direction, and trigger operated means for shifting said collar to disengage said pins from said ratchet means.

5. The double-acting slack adjuster as claimed in claim 4, in which there is a thrust bearing arranged between the dollar and the takeup spin nut, and a trigger spring normally urges said collar and said takeup spin nut into clutching engagement with said tubular housing.

6. The double-acting slack adjuster as claimed in claim 4, in which the cylindrical collar around said takeup spin nut consists of two concentric collars, the outer collar surrounding said tubular casing and the inner collar being inside said tubular casing and around said takeup spin nut, said collars being locked together for shifting movement along said tubular casing, said locking means including pins fastened between said collars and riding in guiding slots formed in said tubular casing.

7. The double-acting slack adjuster as claimed in claim 4, in which said trigger-operated means includes a tubular casing surrounding said first tubular casing and having an abutment thereon adapted to engage said collar upon the presence of excess slack to disengage said takeup spin nut from clutching engagement with said tubular housing and to permit said takeup spin nut to revolve on said rod, and spring means for returning said collar and said trigger tubular casing to normal position.

8. In a double-acting slack adjuster as claimed in claim 4, in which the cylindrical collar has at least two opposite spaced spring-pressed pins and the takeup spin nut has at least three ratchet teeth adapted to be engaged by said pins, whereby only one pin at a time can engage one ratchet tooth as said takeup spin nut is revolved on said threaded rod.

9. In a double-acting slack adjuster connected in the brake rigging of a railway car, a tubular housing and a threaded rod within said tubular housing, said tubular housing being connected to one portion of the brake rigging and said threaded rod to another portion, a plurality of spin nuts threaded on said rod, including a takeup spin nut, a lockup spin nut, and a let-out spin nut, a cylindrical collar around said takeup spin nut, said takeup spin nut slidable along said tubular housing, said takeup spin nut adapted to revolve within said cylindrical collar, cooperative latching pins and ratchet means between said takeup spin nut and said cylindrical collar, cooperative clutching surfaces between said lockup spin nut and said tubular housing, spring means normally urging said takeup spin nut and said lockup spin nut into clutching engagement with said tubular housing, and means responsive to an excess of slack in said brake rigging upon a brake application for rotating said takeup spin nut and said lockup spin nut on said threaded rod to take up the slack.

10. In a double-acting slack adjuster for the brake rigging of a railway car, a tubular casing and a threaded rod within said tubular casing, a plurality of spin nuts threaded on said rod including a takeup spin nut, a lockup spin nut and a let-out spin nut, cooperative stop clutching surfaces between said takeup, said let-out spin nuts, and said tubular housing, trigger means operative responsive to an excess of slack in said brake rigging for causing said takeup spin nut to revolve on said rod, cooperative pin and ratchet means between said takeup spin nut and said trigger means for permitting said takeup spin nut to revolve in the takeup direction on said rod, means responsive to a lack of sufficient slack in said brake rigging for causing said let-out spin nut to revolve on said rod to let out slack, and cooperative clutching means between said let-out spin nut and said tubular casing for permitting said let-out spin nut to revolve in the slack let-out direction.

11. The slack adjuster as claimed in claim 10, in which the cooperative clutching means between the let-out spin nut and the tubular casing, includes a let-out sleeve adapted to slide and revolve around said threaded rod and having a clutching surface with said let-out spin nut, and friction means around said let-out sleeve connected to said tubular casing to control the rotation of said let-out spin nut.

12. In a slack adjuster for the brake rigging of a railway car, a tubular housing, and a threaded rod in said tubular housing, a let-out spin nut on said rod, means responsive to a lack of slack in said brake rigging for causing said let-out spin nut to revolve on said rod in a let-out direction, and means for stopping the rotation of said let-out spin nut, including a let-out sleeve around said rod having clutch means in engagement with said let-out spin nut, and a torsion spring around said let-out sleeve adapted to tightly embrace said let-out sleeve to prevent its rotation on said rod and stop the rotation of said let-out spin nut.

13. In a slack adjuster as claimed in claim 12, in which the let-out sleeve is rotatable on said threaded rod and the torsion spring is wound around the let-out sleeve with one end of the torsion spring anchored in said tubular housing and the remaining portion of the torsion spring wrapped in frictional engagement around said let-out sleeve, said torsion spring adapted to be unwound and become loose on said let-out sleeve whenever said let-out spin nut is caused to revolve on said threaded rod.

14. In a double-acting slack adjuster for the brake rigging of a railway car, a tubular casing and a threaded rod within said tubular casing, a plurality of spin nuts threaded on said rod, including a takeup spin nut, a lockup spin nut normally positioned against said takeup spin nut, and a let-out spin nut spaced apart from said lockup spin nut, trigger means operated responsive to an excess of slack in said brake rigging for causing said takeup spin nut to revolve on said rod, and cooperating pin and ratchet means between said takeup spin nut and said trigger means for permitting said takeup spin nut to revolve in the takeup direction on said rod, and clutching means between each of said spin nuts and said tubular casing for stopping the rotation of said spin nuts as said slack adjuster is operated to take up or let out slack.

15. The structure of claim 14 characterized in that the cooperating pin and ratchet means includes a collar surrounding the takeup spin nut, said collar having spring-biased pins movable parallel to the nut axis, the takeup spin nut having a portion formed with ratchet means opposable to said pins, the collar and spin nut being relatively rotatable in either direction of rotation.